(12) United States Patent
Kim et al.

(10) Patent No.: US 12,026,850 B2
(45) Date of Patent: Jul. 2, 2024

(54) ELECTRONIC DEVICE, AND METHOD FOR PROCESSING WRITING INPUT THEREOF

(71) Applicant: Samsung Electronics Co., Ltd., Suwon-si (KR)

(72) Inventors: Kyungmin Kim, Suwon-si (KR); Heungkyo Seo, Suwon-si (KR); Junho Lee, Suwon-si (KR); Sojeong Cha, Suwon-si (KR); Hyungdo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/160,512

(22) Filed: Jan. 27, 2023

(65) Prior Publication Data

US 2023/0177648 A1  Jun. 8, 2023

Related U.S. Application Data

(63) Continuation of application No. PCT/KR2021/010115, filed on Aug. 3, 2021.

(30) Foreign Application Priority Data

Aug. 4, 2020  (KR) .......................... 10-2020-0097472

(51) Int. Cl.
*G06T 3/608* (2024.01)
*G06F 3/04845* (2022.01)
(Continued)

(52) U.S. Cl.
CPC .......... *G06T 3/608* (2013.01); *G06F 3/04845* (2013.01); *G06F 3/04883* (2013.01); *G06V 30/36* (2022.01)

(58) Field of Classification Search
CPC . G06T 3/608; G06F 3/04845; G06F 3/04883; G06F 3/04842; G06V 30/36
See application file for complete search history.

(56) References Cited

U.S. PATENT DOCUMENTS

| 5,596,350 A | 1/1997 | Capps et al. |
| 9,922,014 B2 | 3/2018 | Kim et al. |

(Continued)

FOREIGN PATENT DOCUMENTS

| JP | 7-192088 A | 7/1995 |
| KR | 10-2014-0105385 A | 9/2014 |

(Continued)

OTHER PUBLICATIONS

Extended European Search Report dated Dec. 1, 2023, issued in European Patent Application No. EP21852703.4.
(Continued)

*Primary Examiner* — Cao H Nguyen
(74) *Attorney, Agent, or Firm* — Jefferson IP Law, LLP

(57) ABSTRACT

An electronic device is provided. The electronic device includes a display, an input sensing circuit capable of acquiring a handwriting input inputted through the display, and at least one processor electrically connected to the display and the input sensing circuit, wherein the at least one processor uses the input sensing circuit to recognize written characters generated by means of the handwriting input inputted through the display, determines the slope of the recognized written characters, horizontally aligns the recognized written characters on the basis of the determined slope, and controls the display so that the recognized written characters and the horizontally aligned written characters are overlapped and displayed.

20 Claims, 11 Drawing Sheets

(51) Int. Cl.
G06F 3/04883 (2022.01)
G06V 30/32 (2022.01)

(56) References Cited

U.S. PATENT DOCUMENTS

| | | | |
|---|---|---|---|
| 10,423,312 | B2 | 9/2019 | Lee et al. |
| 2009/0116744 | A1 | 5/2009 | Woo et al. |
| 2014/0245137 | A1 | 8/2014 | Kim et al. |
| 2016/0147723 | A1* | 5/2016 | Lee ................ G06F 40/171 715/268 |
| 2018/0024656 | A1 | 1/2018 | Kim et al. |
| 2020/0356254 | A1* | 11/2020 | Missig ............ G06F 3/0485 |
| 2021/0042027 | A1* | 2/2021 | Lee ................ G06F 40/171 |

FOREIGN PATENT DOCUMENTS

| | | |
|---|---|---|
| KR | 10-2014-0114224 A | 9/2014 |
| KR | 10-2015-0024107 A | 3/2015 |
| KR | 10-1623213 B1 | 5/2016 |
| KR | 10-2016-0062566 A | 6/2016 |
| KR | 10-2018-0010029 A | 1/2018 |
| KR | 10-2020-0032492 A | 3/2020 |

OTHER PUBLICATIONS

Indian Office Action dated May 3, 2024, issued in Indian Patent Application No. IN202317006412.

* cited by examiner

ELECTRONIC DEVICE, AND METHOD FOR PROCESSING WRITING INPUT THEREOF

CROSS-REFERENCE TO RELATED APPLICATION(S)

This application is a continuation application, claiming priority under § 365(c), of an International application No. PCT/KR2021/010115, filed on Aug. 3, 2021, which is based on and claims the benefit of a Korean patent application number 10-2020-0097472, filed on Aug. 4, 2020, in the Korean Intellectual Property Office, the disclosure of which is incorporated by reference herein in its entirety.

BACKGROUND

1. Field

The disclosure relates to an electronic device and a method of processing a handwriting input thereto.

2. Description of Related Art

Electronic devices (e.g., a mobile terminal, a smartphone, a wearable terminal, and the like) may provide various functions (e.g., music playback function, navigation function, short-distance wireless communication function {Bluetooth, wireless-fidelity (Wi-Fi), or near field communication (NFC)}, fingerprint recognition function, photo {still image} taking or video capturing {recording} function, or electronic payment function, and the like).

The electronic device may provide a writing input function using an input device (e.g., a stylus pen, an electronic pen, a finger, and the like). In addition, the electronic device may display handwriting input by the user as it is without any conversion process.

The above information is presented as background information only to assist with an understanding of the disclosure. No determination has been made, and no assertion is made, as to whether any of the above might be applicable as prior art with regard to the disclosure.

SUMMARY

Meanwhile, a handwriting input may have various characteristics (e.g., font size, line, alignment, font, pressure, slant, stroke characteristic {e.g., slant at the tip of a stroke}, and the like). The electronic device may display the input handwriting as it is without any conversion process for various characteristics of the handwriting input made by the user. As a result, since written characters input by the user may have different sizes, letter spacing, slant, and the like, readability may deteriorate.

Therefore, there is a demand for a technique capable of effectively providing the user with more neatly aligned written characters while maintaining the user's handwriting.

Aspects of the disclosure are to address at least the above-mentioned problems and/or disadvantages and to provide at least the advantages described below. Accordingly, an aspect of the disclosure is to provide an electronic device, method for processing writing input thereof.

Additional aspects will be set forth in part in the description which follows and, in part, will be apparent from the description, or may be learned by practice of the presented embodiments.

In accordance with an aspect of the disclosure, an electronic device is provided. The electronic device includes a display, an input sensing circuit configured to acquire a handwriting input received through the display, and at least one processor configured to be electrically connected to the display and the input sensing circuit, wherein the at least one processor may be configured to use the input sensing circuit to recognize written characters generated by the handwriting input received through the display, to determine the slant of the recognized written characters, to straighten the recognized written characters based on the determined slant, and to control the display so that the recognized written characters and the straightened written characters are overlapped and displayed.

In accordance with another aspect of the disclosure, an operation method of an electronic device is provided. The operation method includes recognizing written characters input to a user input unit, determining the slant of the recognized written characters, straightening the recognized written characters based on the determined slant, and overlapping and displaying the recognized written characters and the straightened written characters.

An electronic device and method according to various embodiments of the disclosure may improve an emotional and intuitive feeling of use for a user by effectively providing more neatly aligned written characters.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
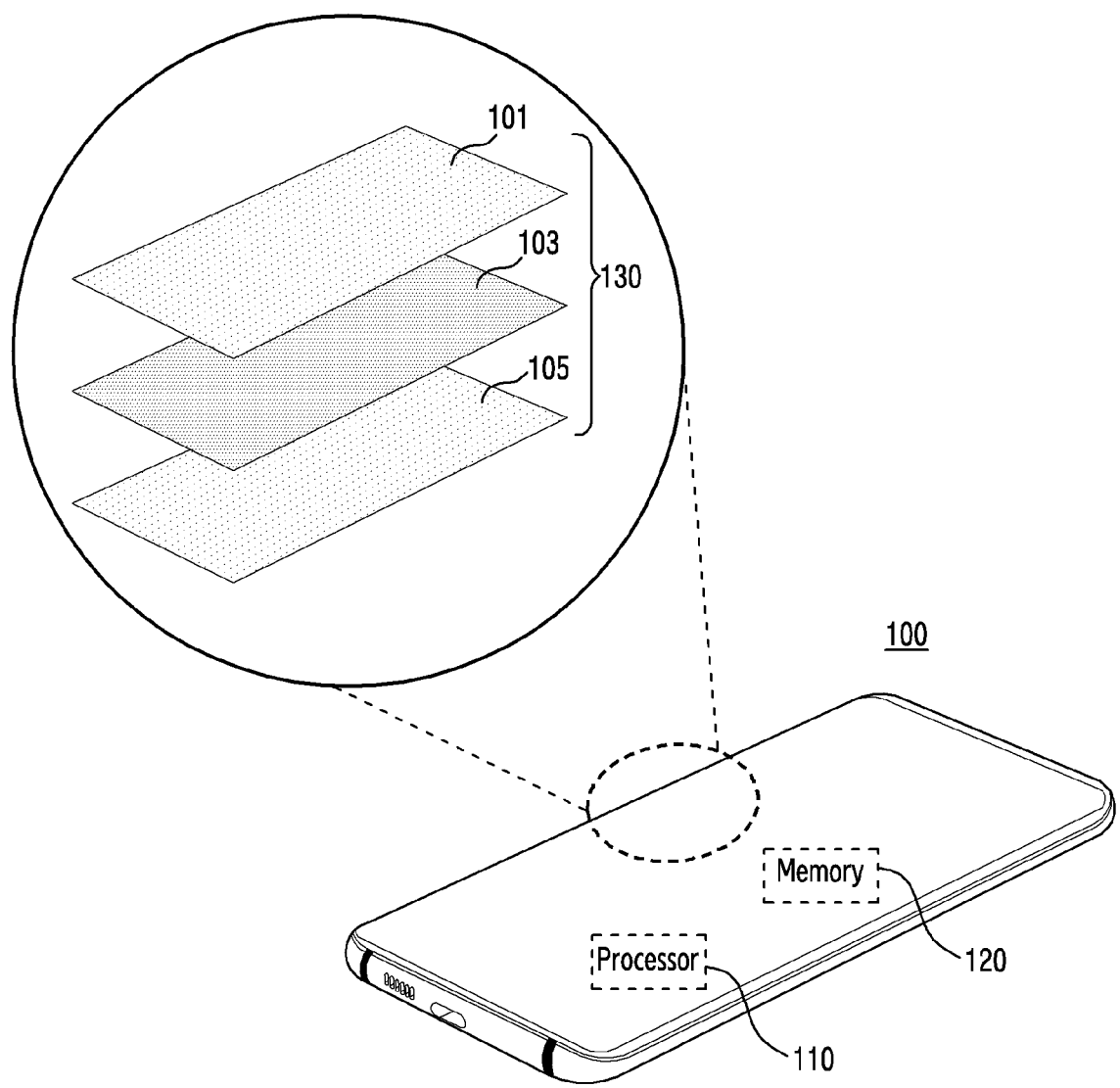
FIG. 1 is a diagram illustrating a hardware configuration of an electronic device according to an embodiment of the disclosure.

FIG. 1 is a diagram illustrating a hardware configuration of an electronic device according to an embodiment of the disclosure.

Referring to FIG. 1, an electronic device 100 may include a processor 110, a memory 120, and a display 130.

According to an embodiment, the processor 110 may control the overall operation of each component of the electronic device 100. In particular, when a handwriting input by a user is recognized, the processor 110 may control a series of processes of processing input written characters. To this end, the processor 110 may be electrically connected to the memory 120 and the display 130.

According to an embodiment, the display 130 may include a display panel module 103, a touch screen panel (TSP) 101 located on an upper surface of the display panel module 103 and configured to detect a capacitive touch input, and a digitizer module 105 located on a lower surface of the display panel module 103 and configured to detect an electro-magnetic resonance (EMR) pen input.

According to various embodiments, the display 130 may have various stacked structures. For example, unlike the illustrated example, the display 130 is implemented as an in-cell type in which a touch panel is integrated with a pixel layer. In addition, the digitizer module 105 may be omitted from the display 130. Various embodiments disclosed in this document may be applied to a user's handwriting input obtained through the TSP 101 and may also be applied to a user's handwriting input obtained through the digitizer module 105. In general, the electronic device 100 may include an appropriate input detection means capable of detecting a user's handwriting input, and hereinafter referred to as an input sensing circuit.

According to another embodiment, when the display panel module 103 is constituted of a general liquid-crystal display (LCD) display panel, the display panel module 103 may include a liquid crystal panel configured to form an image and a backlight assembly configured to emit light to the rear surface of the liquid crystal panel. When the display panel module 103 is constituted of a general organic light-emitting diodes (OLED) display panel, the display panel module 103 may include an upper electrode, an organic material layer, a lower electrode, and a substrate.

According to another embodiment, the memory 120 may store programs and data necessary for the operation of the electronic device 100. The memory 120 may include a program area and a data area according to the type of data to be stored. For example, the program area stores a program controlling the overall operation of the electronic device 100, an operating system (OS) for booting the electronic device 100, an application program necessary for playing multimedia content, or other option functions of the electronic device 100 such as applications required for a camera function, a sound reproduction function, an image or video reproduction function, and the like. In addition, the data area is an area in which data generated according to the use of the electronic device 100 is stored, and may store images, videos, phone books, audio data, and the like. For example, the memory 120 may store text to which specific attributes and/or characteristics are applied.

Figure 2:
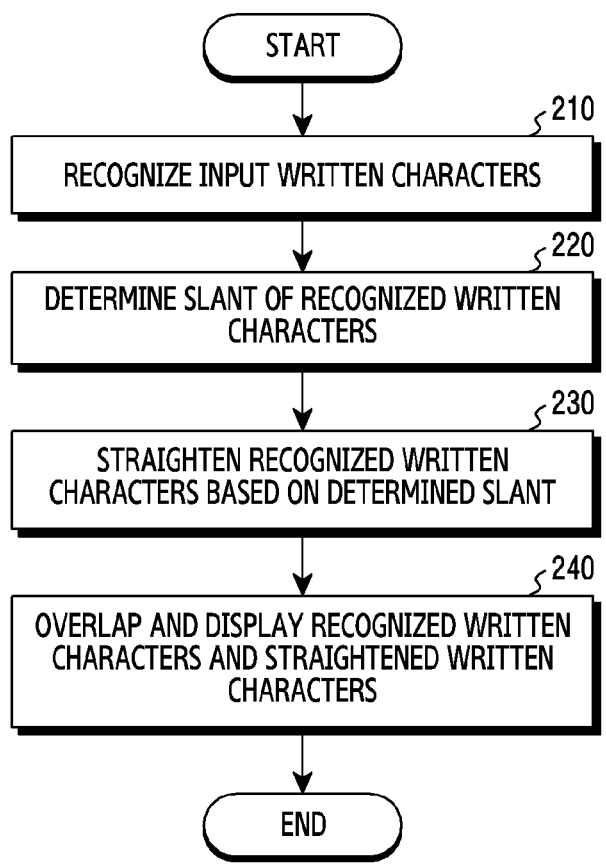
FIG. 2 is a flowchart illustrating a case in which an electronic device straightens a handwriting input according to an embodiment of the disclosure.

FIG. 2 is a flowchart illustrating a case in which an electronic device straightens a handwriting input according to an embodiment of the disclosure.

Referring to FIG. 2, in operation 210, a processor (e.g., the processor 110) of an electronic device (e.g., the electronic device 100 of FIG. 1) according to an embodiment may recognize a user's handwriting input using an input device. For example, the input device includes a digital pen, a stylus pen, and a finger. According to an embodiment, the processor 110 may detect the handwriting input through an input sensing circuit (e.g., a capacitive input sensing circuit, an electromagnetic induction type input sensing circuit, etc.) included in a display (e.g., the display 130 of FIG. 1).

In operation 220, the processor 110 according to an embodiment may check attributes and/or characteristics of the handwriting input. For example, the processor 110 determines the attributes of the handwriting input and/or the characteristics of the handwriting input including character size, line, alignment, slant, and stroke characteristic (e.g., slant at the tip of stroke).

The processor 110 according to another embodiment may determine a slant of the text corresponding to the slant of the handwriting input (or the slant of the electronic pen).

In operation 230, the processor 110 according to another embodiment may straighten written characters based on the determined slant of the written characters. According to another embodiment, the processor may display the straightened text in a preview window. For example, the preview window refers to an area determined using a handler. A detailed description of the handler will be described later in the description of FIGS. 3, 5, and 6.

In operation 240, the processor 110 according to another embodiment may overlap and display the written characters before being straightened and the straightened written characters. According to another embodiment, the processor 110 may overlap and display the written characters before being straightened and the straightened written characters in the preview window. According to another embodiment, the processor 110 may process the written characters before being straightened to be translucent and may process the straightened written characters to be opaque.

Figure 3:
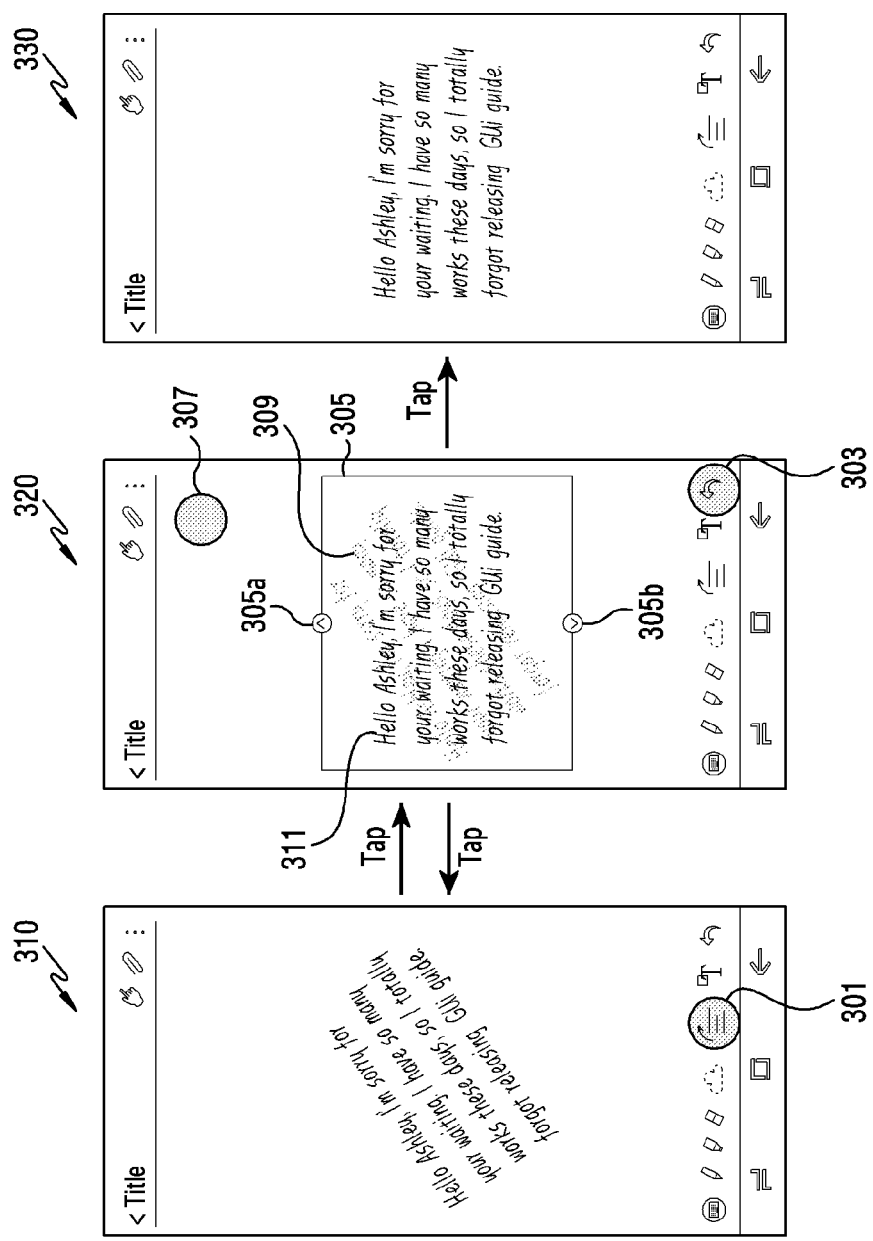
FIG. 3 is a flowchart illustrating a case in which an electronic device aligns characters according to positions of written characters according to an embodiment of the disclosure.

FIG. 3 is a flowchart illustrating a case in which an electronic device aligns characters according to positions of written characters according to an embodiment of the disclosure.

Referring to FIG. 3, as shown in a first screen 310 of FIG. 3, the processor 110 according to an embodiment may perform handwriting recognition in real-time in response to detection of the handwriting input (e.g., a stroke input). For example, the handwriting input is made using a digital pen, a stylus pen, or a finger. According to another embodiment, the processor 110 may recognize a user's handwriting input and may provide the recognition result (e.g., text) through the display 130.

As shown in a second screen 320 of FIG. 3, the processor 110 according to an embodiment may display a handler 305 in response to a user input. For example, the processor 110 displays the handler 305 in response to a touch (e.g., tap) of an icon 301.

According to another embodiment the handler 305 may be movable. For example, the processor 110 may move the position of the handler 305 in response to a user's drag input moving after touching the handler 305.

According to another embodiment, the handler 305 may include resizing items 305a and 305b. The processor 110 may change the size of an area to be straightened in response to a user's touch or drag input on the items 305a and 305b. For example, the processor 110 extends the size of the handler 305 upward in response to a user's selection (touch or drag) of the first item 305a, and extends the size of the handler 305 downward in response to a selection (touch or drag) of the second item 305b. In response to a change in the size of the handler 305, the size of the preview window may also be changed. According to some embodiments, the size of the handler 305 may be changed in the left and right directions.

According to another embodiment, the processor 110 may overlap written characters 309 before being straightened and written characters 311 after being straightened and may display the overlapped characters on the preview window. For example, the written characters 309 before being straightened is processed to be translucent, and the written characters 311 after being straightened may be processed to be opaque.

According to another embodiment, the processor 110 may reperform handwriting input recognition. According to an embodiment, the processor may add a new handwriting input to an existing handwriting input. For example, the processor 110 removes the display of the handler in response to a touch (e.g., tap) of the icon 303 and may add a new handwriting input to the existing handwriting input.

As shown in a third screen 330 of FIG. 3, the processor 110 according to another embodiment may remove the handler 305 and the display of the written characters 309 before being straightened.

The processor 110 according to an embodiment may determine whether a conversion request by a user is detected. For example, the processor determines whether a designated touch input 307 (e.g., a touch, a long touch, or a double touch) is detected in an area other than the preview window.

According to another embodiment, when the conversion request by the user is detected, the processor 110 may convert (or replace) the handwriting input into straightened characters. For example, as shown in the third screen 330 of FIG. 3, the processor 110 removes the handler 305 and the written character 309 before being straightened, and may display the written characters 311 to which attributes and/or characteristics of straightening are applied.

According to another embodiment, the processor 110 may store written data in the memory 120. For example, the written data may include the written character 311 and/or an image to which the attributes and/or characteristics of straightening are applied.

Figure 4:
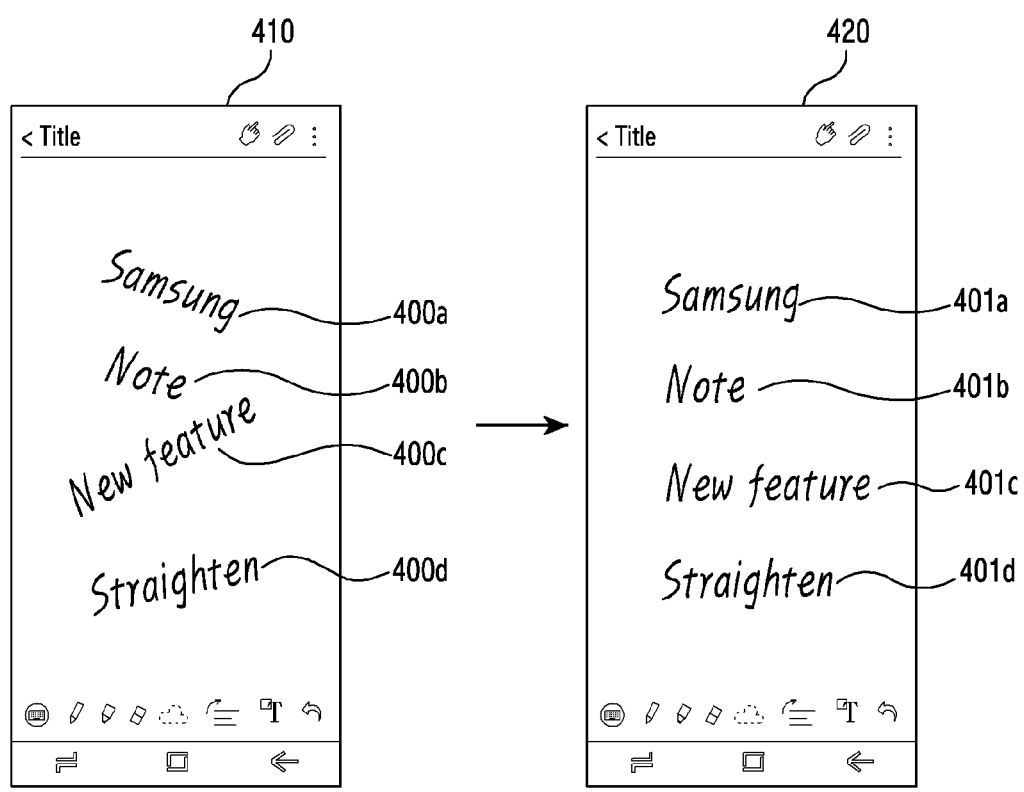
FIG. 4 is a diagram illustrating a method of processing a handwriting input by an electronic device according to an embodiment of the disclosure.

FIG. 4 is a diagram illustrating a method of processing a handwriting input by an electronic device according to an embodiment of the disclosure.

In relation to the description of FIG. 4, contents similar to or corresponding to those described above may be briefly described or omitted.

Referring to FIG. 4, the processor 110 according to an embodiment may perform operations 210 and 220 on a first screen 410 of FIG. 4.

According to an embodiment, the processor 110 may determine the slant of written characters differently for each character string based on a configured rule such as coordinates of pixels representing the written characters. For example, the processor 110 determines the slants of handwriting inputs displayed on a first screen 410 of FIG. 4 to be different.

According to another embodiment, as shown in a second screen 420 of FIG. 4, the processor 110 may perform operations 230 and 240 on the first screen 410. The processor 110 according to an embodiment may perform a straightening operation on handwriting inputs 400a, 400b, 400c, and 400d displayed on the first screen 410 of FIG. 4.

According to another embodiment, when the straightening operation is completed, as shown in the second screen 420 of FIG. 4, straightened written characters 401a, 401b, 401c, and 401d may have the same slant.

Figure 5:
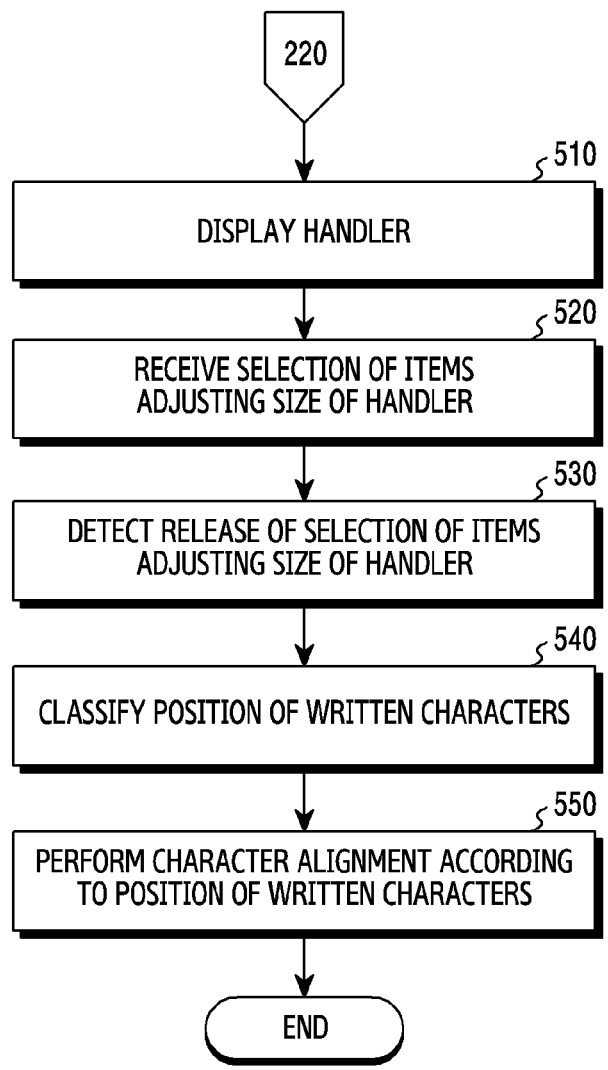
FIG. 5 is an operation diagram illustrating a method of processing a handwriting input by an electronic device according to an embodiment of the disclosure.

FIG. 5 is an operation diagram illustrating a method of processing a handwriting input by an electronic device according to an embodiment of the disclosure.

The following description may be an operation performed after operation 220 of FIG. 2 is performed. In the following embodiments, respective operations may be performed sequentially, but not necessarily sequentially performed. For example, the order of the respective operations may be changed, or at least two operations may be performed in parallel. An operation subject of the illustrated operation diagram may be understood as the electronic device 100 or components (e.g., the processor 110, the memory 120, or the display 130) of the electronic device 100. In relation to the description of FIG. 5, contents similar to or corresponding to those described above may be briefly described or omitted.

Referring to FIG. 5, in operation 510, the processor 110 according to an embodiment may display a handler (e.g., the handler 305 of FIG. 3). For example, when it is determined that the handwriting input by the user is completed, the processor 110 displays the handler 305 in response to a user input such as a touch of an icon.

In operation 520, the processor 110 according to an embodiment may receive a user's selection of the items 305a and 305b. For example, the processor 110 detects that the user touches or drags the items 305a and 305b. According to an embodiment, the size of the handler 305 may be changed in the vertical direction. According to another embodiment, the size of the handler 305 may be changed in the left and right directions.

In operation 530, the processor 110 according to another embodiment may receive a release of the user's selection of the items 305a and 305b. For example, the processor 110 detects that the user's drag input to the items 305a and 305b is released.

In operation 540, the processor 110 according to an embodiment may classify the positions of the written characters. For example, the processor 110 distinguishes written characters within an area determined by the handler 305 from written characters outside the area determined by the handler 305.

In operation 550, the processor 110 according to an embodiment may perform character alignment according to the position of the written characters. According to another embodiment, the written characters within the area determined by the handler 305 may be straightened, and the written characters outside the area determined by the handler 305 may maintain an existing slant.

According to another embodiment, the processor 110 may display a result of aligning the written characters through the preview window. A detailed description of a method of displaying the result of straightening of the written characters through the preview window will be described later with reference to FIG. 6.

Figure 6:
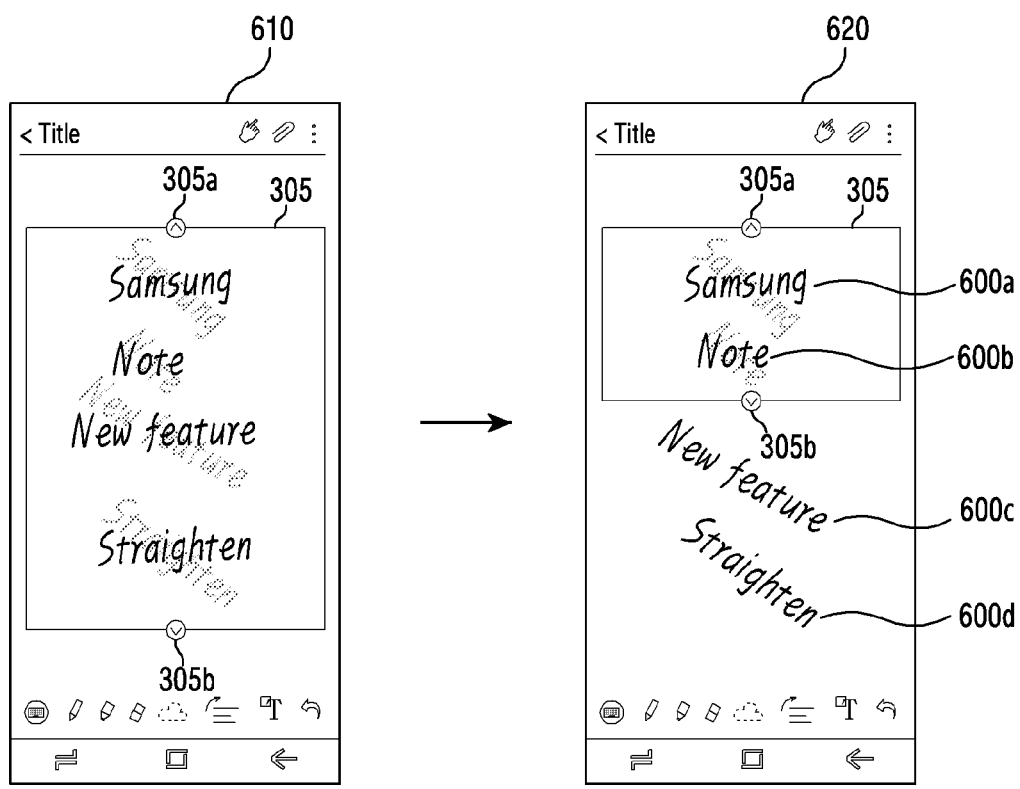
FIG. 6 is a diagram illustrating a method of processing a handwriting input by an electronic device using a handler according to an embodiment of the disclosure.

FIG. 6 is a diagram illustrating a method of processing a handwriting input by an electronic device using a handler according to an embodiment of the disclosure.

Referring to FIG. 6, in operation 510, a processor (e.g., processor 110) of an electronic device (e.g., the electronic device 100) according to an embodiment of the disclosure may display a screen including a handwriting input and a handler. For example, as shown in a first screen 610 and a second screen 620 of FIG. 6, the processor may display a handwriting (e.g., a memo) previously made by the user and the handler 305 on a display (e.g., the display 130 of FIG. 1). The handwriting may have various attributes and/or characteristics.

The processor 110 according to an embodiment of the disclosure may display text to which attributes and/or characteristics are applied in the preview window. According to another embodiment, the processor 110, upon detecting a release of the user's drag input for the items 305a and 305b, may immediately and straighten and display the written characters within an area determined by the handler 305 through the preview window. For example, the processor 110 overlaps the written characters before being straightened and the straightened written characters, and may display the overlapped characters through the preview window.

According to another embodiment, the processor 110, while the user continues dragging the items 305a and 305b, may visually provide a shape in which written characters 600a and 600b being within the area determined by the handler 305 are straightened, through the preview window.

According to another embodiment, the processor 110 may visually provide, through the display 130, a shape in which an existing slant for written characters 600c and 600d being outside the area determined by the handler 305 is maintained.

According to another embodiment, the position of the handler 305 may be moved in response to a user's input (e.g., touch and drag). According to one embodiment, as described above, the size of the handler 305 may be adjusted in response to a user input for the items 305a and 305b. According to another embodiment, when the position or size of the handler 305 is changed, the processor 110 may reperform straightening on the changed preview window area or perform straightening only on the added area.

Figure 7:
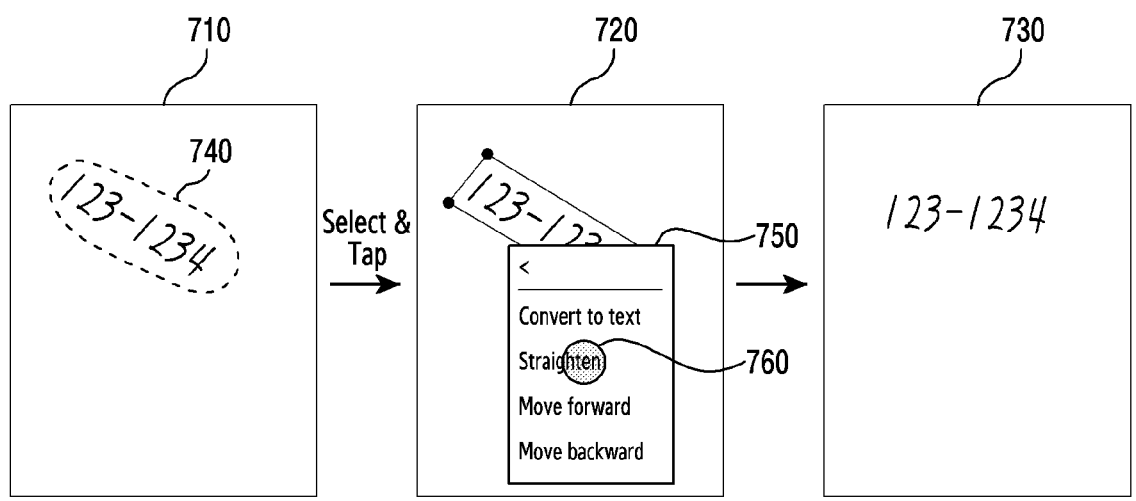
FIG. 7 is a diagram illustrating a method of processing a handwriting input by an electronic device using a handler according to an embodiment of the disclosure.

FIG. 7 is a diagram illustrating a method of processing a handwriting input by an electronic device using a handler according to an embodiment of the disclosure.

In relation to the description of FIG. 7, contents similar to or corresponding to those described above may be briefly described or omitted.

Referring to FIG. 7, in operation 510, a processor (e.g., the processor 110) of an electronic device (e.g., the electronic device 100) according to an embodiment of the disclosure may display a screen including a handwriting input and a handler. For example, as shown in a first screen 710 and a second screen 720 of FIG. 7, the processor displays a handwriting (e.g., a memo), previously made by the user and stored, and a handler 740 on a display (e.g., the display 130 of FIG. 1). The handwriting may have various attributes and/or characteristics.

As shown in the first screen 710 of FIG. 7, the processor 110 according to an embodiment of the disclosure may select input written characters to which an effect is to be applied using the handler 740. For example, the handler 740 may include a lasso tool.

According to an embodiment, the processor 110 may display a context menu 750 in response to a touch input (e.g., a long touch) for a portion of the selected handwriting input (handwriting). According to another embodiment, the context menu 750, as shown in the second screen 720 of FIG. 7, may be displayed around the handwriting input in a floating manner.

According to another embodiment, the context menu 750 may include a text conversion context, a straightening context, a copy context, a crop context, and a style change context.

The processor 110 according to another embodiment may determine whether a designated touch input 760 (e.g., a tap or a double tap) for the context included in the context menu 750 is detected. According to another embodiment, when the designated touch input for the context is detected, the processor may convert the handwriting input into text to which attributes and/or characteristics related to the selected context are applied. For example, when a designated touch input for the straightening context is detected, as shown in a third screen 730 of FIG. 7, the processor 110 removes the handler 740 and the written characters before being straightened, and may display text to which attributes and/or characteristics of straightening are applied.

Figure 8A:
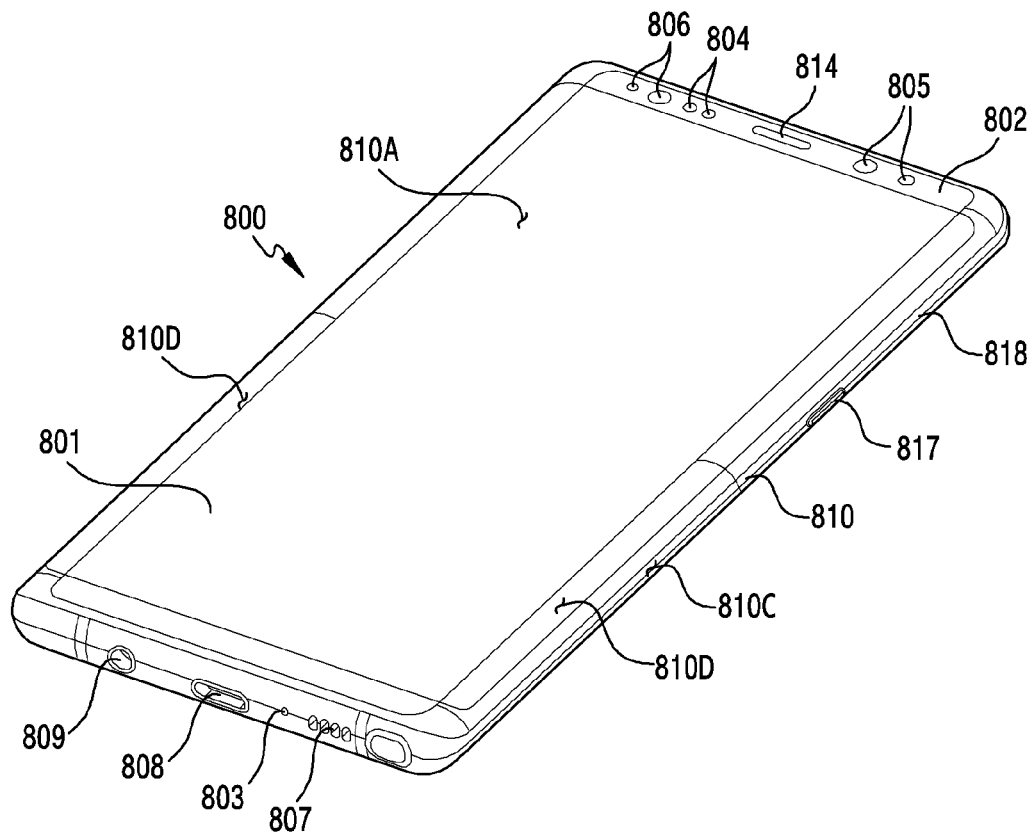
FIG. 8A is a perspective view illustrating a front surface of a mobile electronic device according to an embodiment of the disclosure.

FIG. 8A is a perspective view illustrating a front surface of a mobile electronic device according to an embodiment of the disclosure.

Figure 8B:
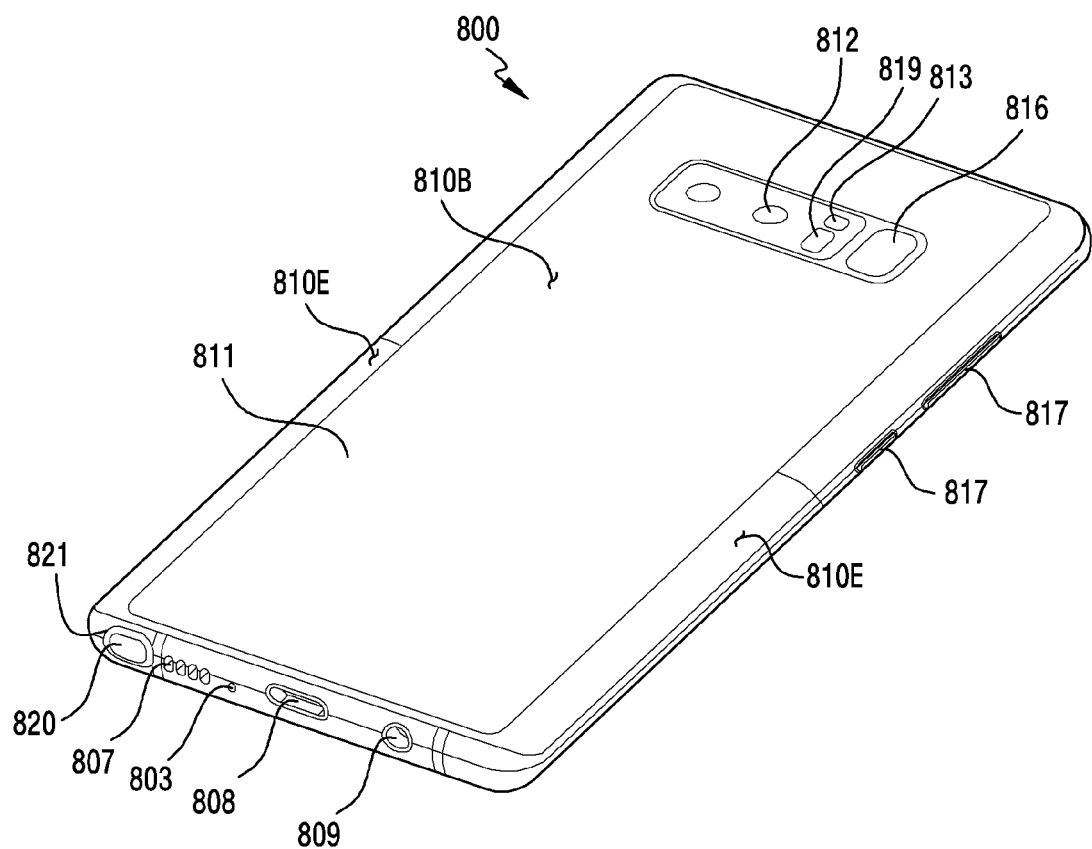
FIG. 8B is a perspective view illustrating a rear surface of the electronic device of FIG. 8A according to an embodiment of the disclosure.

FIG. 8B is a perspective view illustrating a rear surface of the electronic device of FIG. 8A according to an embodiment of the disclosure.

Referring to FIGS. 8A and 8B, an electronic device 800 according to an embodiment may comprise a housing 810 comprising a first surface (or front surface) 810A, a second surface (or rear surface) 810B, and a side surface 810C surrounding a space between the first surface 810A and the second surface 810B. In another embodiment (not illustrated), the housing may refer to a structure that forms a part of the first surface 810A, the second surface 810B and the side surface 810C of FIG. 1. According to an embodiment, the first surface 810A may be formed by a front plate 802 (e.g., a glass plate including various coating layers, or a polymer plate) in which at least a part thereof is substantially transparent. The second surface 810B may be formed by a substantially opaque rear plate 811. The rear plate 811 may be formed by, for example, coated or colored glass, ceramic, polymer, metal (e.g., aluminum, stainless steel (STS), or magnesium), or a combination of at least two of the above materials. The side surface 810C may be coupled to the front plate 802 and the rear plate 811 and may be formed by a side bezel structure (or "side member") 818 including a metal and/or a polymer. In some embodiments, the rear plate (811) and the side bezel structure (818) are integrally formed and may contain the same material (e.g., a metal material such as aluminum).

In the illustrated embodiment, the front plate 802 includes two first regions 810D that are curved and seamlessly extended from the first surface 810A toward the rear plate 811 at both ends of a long edge of the front plate 802. In the illustrated embodiment (see FIG. 2), the rear plate 811 has two second regions 810E that are curved and seamlessly extended from the second surface 810B toward the front plate 802 at both ends of a long edge. In some embodiments, the front plate 802 (or the rear plate 811) may include only one of the first regions 810D (or the second regions 810E). In another embodiment, some of the first regions 810D or the second regions 810E may not be included. In the above embodiments, when viewed from the side of the electronic device 800, the side bezel structure 818 has a first thickness (or width) at a side surface that the first regions 810D or the second regions 810E are not included, and has a second thickness thinner that the first thickness at a side surface that the first regions 810D or the second regions 810E are included.

According to another embodiment, the electronic device 800 includes at least one of a display 801, audio modules 803, 807, 814, sensor modules 804, 816, 819, and camera modules 805, 812, 813, a key input device 817, a light emitting device 806, a pen input device 820, and connector holes 808, 809. In some embodiments, the electronic device 800 may omit at least one of the components (e.g., the key input device 817 or the light emitting device 806) or may additionally include other components.

The display 801, for example, is exposed through a substantial portion of the front plate 802. In some embodiments, at least a portion of the display 801 may be exposed through the front plate 802 forming the first region of the first surface 810A and the side surface 810C. In some embodiments, a corner of the display 801 may be substantially identical to an adjacent outer shape of the front plate 802. In another embodiment (not shown), in order to expand the area where the display 801 is exposed, the distance between the periphery of the display 801 and the periphery of the front plate 802 may be substantially equal.

In another embodiment (not shown), a recess or an opening is formed in a part of the screen display area of the display 801, and at least one of the audio module 814, the sensor module 804, the camera module, and the light emitting element 806 aligned with the recess or the opening 805 is comprised. In another embodiment (not shown), on the back of the screen display area of the display 801, an audio module 814, a sensor module 804, a camera module 805, a fingerprint sensor (i.e., fourth sensor module 816), and a light emitting element 806 may include at least one of them. In another embodiment (not shown), the display 801 is coupled to or adjacent to a touch sensing circuit, a pressure sensor capable of measuring the intensity (pressure) of a touch, and/or a digitizer that detects a magnetic stylus pen. can be placed. In some embodiments, at least a portion of the sensor modules 804, 819, and/or at least a portion of the key input device 817 may be disposed in the first regions 810D and/or the second regions 810E.

The audio modules 803, 807, and 814 may include a microphone hole 803 and speaker holes 807 and 814. A microphone for acquiring external sound may be disposed inside the microphone hole 803, and in some embodiments, a plurality of microphones may be disposed to detect the direction of sound. The speaker holes 807 and 814 may include an external speaker hole 807 and a receiver hole 814 for communication. In some embodiments, the speaker holes 807 and 814 and the microphone hole 803 may be implemented as one hole, or a speaker may be included without the speaker holes 807 and 814 (e.g., a piezo speaker).

The sensor modules 804, 816, 819 may generate electrical signals or data values corresponding to an internal operating state of the electronic device 800 or an external environmental state. The sensor modules 804, 816, 819 may include, for example, a first sensor module 804 (e.g., a proximity sensor) and/or a second sensor module (not shown) (e.g., a fingerprint sensor) disposed on the first surface 810A of the housing 810, and/or a third sensor module 819 (e.g., a heart rate monitor (HRM) sensor) and/or a fourth sensor module 816 disposed on the second surface 810B of the housing 810. The fingerprint sensor may be disposed on the second surface 810B as well as the first surface 810A (e.g., the display 801) of the housing 810. The electronic device 800 may include a sensor module (not shown), for example, at least one of a gesture sensor, a gyro sensor, a pressure sensor, a magnetic sensor, an acceleration sensor, a grip sensor, a color sensor, an infrared (IR) sensor, a bio sensor, a temperature sensor, a humidity sensor, or an illuminance sensor (i.e., first sensor module 804) may be further used.

The camera modules 805, 812, 813 include a first camera device 805 disposed on the first surface 810A of the electronic device 800, a second camera device 812, disposed on the second surface 810B and/or flash 813. The camera devices 805, 812 may include one or a plurality of lenses, an image sensor, and/or an image signal processor. The flash 813 may include, for example, a light emitting diode or a xenon lamp. In some embodiments, two or more lenses (infrared camera, wide-angle and telephoto lenses) and image sensors may be disposed on one side of the electronic device 800.

The key input device 817 may be disposed on the side surface 810C of the housing 810. In other embodiments, the electronic device 800 may not include some or all of the above-mentioned key input devices 817, and the key input devices 817 that are not included may be implemented in different type such as soft keys on the display 801. In some embodiments, the key input device may include a sensor module 816 disposed on the second surface 810B of the housing 810.

The light emitting element 806, for example, is disposed on the first surface 810A of the housing 810. The light emitting element 806 may provide, for example, state information of the electronic device 800 in the form of light. In another embodiment, the light emitting element 806 may provide, for example, a light source interlocked with the operation of the camera module 805. The light emitting element 806 may include, for example, an LED, an IR LED, and a xenon lamp.

The connector holes 808 and 809 may include a first connector hole 808 capable of receiving a connector (e.g., a universal serial bus (USB) connector) for transmitting and receiving power and/or data to and from an external electronic device, to or from an external electronic device and/or a second connector hole (e.g., an earphone jack) 809 capable of accommodating a connector for transmitting and receiving an audio signal to or from the external electronic device.

The pen input device 820 (e.g., a stylus pen) is guided into the housing 810 through the hole 821 formed on the side of the housing 810 and can be inserted or detached, and may comprise a button to easily detached. A separate resonant circuit is built into the pen input device 820 and may be interlocked with the electromagnetic induction panel 835 (e.g., a digitizer) included in the electronic device 800. The pen input device 820 may include an electro-magnetic resonance (EMR) method, an active electrical stylus (AES) method, and an electric coupled resonance (ECR) method.

Figure 8C:
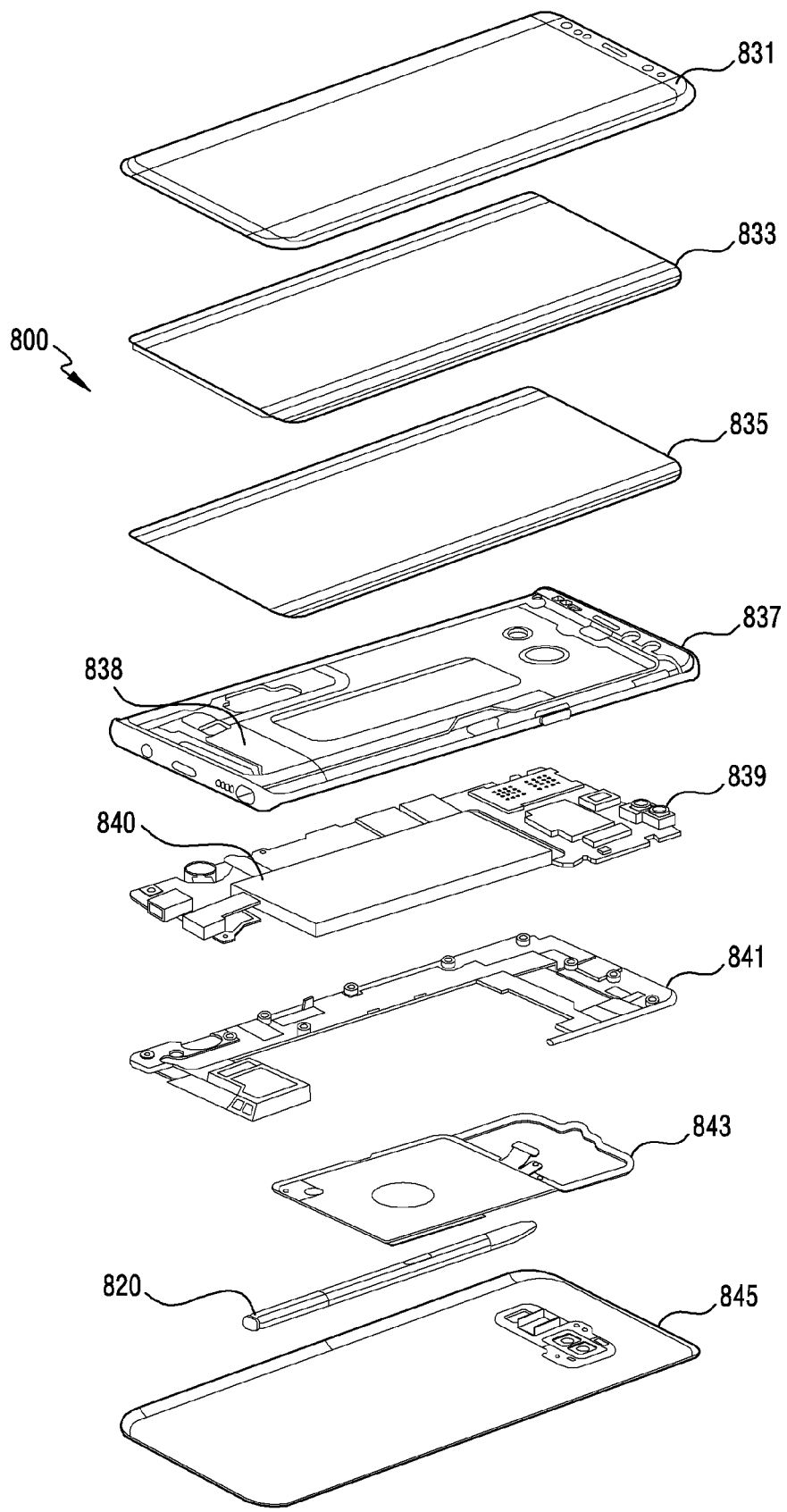
FIG. 8C is an exploded perspective view illustrating the electronic device of FIG. 8A according to an embodiment of the disclosure.

FIG. 8C is an exploded perspective view illustrating the electronic device of FIG. 8A according to an embodiment of the disclosure.

Referring to FIG. 8C, the electronic device 800 includes a side bezel structure 837, a first support member 838 (e.g., a bracket), a front plate 831, a display 833, and an electromagnetic induction panel 835, printed circuit board 839, battery 840, second support member 841 (e.g., rear case), antenna 843, pen input device 820, and back plate 845. In some embodiments, the electronic device 800 may omit at least one of the components (e.g., the first support member 838 or the second support member 841) or may additionally include other components. At least one of the components of the electronic device 800 may be the same as or similar to at least one of the components of the electronic device 800 of FIG. 1 or 2, and duplicate descriptions are omitted below.

The electromagnetic induction panel 835 (e.g., a digitizer) may be a panel for sensing an input of the pen input device 820. For example, the electromagnetic induction panel 835 includes a printed circuit board (PCB) (e.g., a flexible printed circuit board (FPCB)) and a shielding sheet. The shielding sheet may prevent interference between components (e.g., a display module, a printed circuit board, an electromagnetic induction panel, etc.) included in the electronic device 800 caused by an electromagnetic field generated from the components. The shielding sheet blocks electromagnetic fields generated from components, so that an input from the pen input device 820 is accurately transferred to a coil included in the electromagnetic induction panel 835. The electromagnetic induction panel 835 according to various embodiments may include an opening formed in at least a partial region corresponding to a biometric sensor mounted on the electronic device 800.

The first support member 838 may be disposed inside the electronic device 800 and connected to the side bezel structure 837, or may be integrally formed with the side bezel structure 837. The first support member 838 may be formed of, for example, a metal material and/or a non-metal (e.g., polymer) material. The display 833 may be coupled to one surface of the first support member 838 and the printed circuit board 839 may be coupled to another surface. A processor, memory, and/or interface may be mounted on the printed circuit board 839. The processor may include, for example, one or more of a central processing unit, an application processor, a graphics processing unit, an image signal processor, a sensor hub processor, or a communication processor.

The memory may include, for example, volatile memory or non-volatile memory.

The interface may include, for example, a high definition multimedia interface (HDMI), a universal serial bus (USB) interface, a secure digital (SD) card interface, and/or an audio interface. The interface may electrically or physically connect the electronic device 800 to an external electronic device, and may include a USB connector, an SD card/multimedia card (MMC) connector, or an audio connector.

The battery 840 is a device for supplying power to at least one component of the electronic device 800, and may include, for example, a non-rechargeable primary battery, a rechargeable secondary battery, or a fuel cell. At least a portion of the battery 840, for example, may be disposed on a substantially coplanar surface with the printed circuit board 839. The battery 840 may be integrally disposed inside the electronic device 800 or may be disposed detachably from the electronic device 800.

The antenna 843 may be disposed between the rear plate 845 and the battery 840. The antenna 843 may include, for example, a near field communication (NFC) antenna, a wireless charging antenna, and/or a magnetic secure transmission (MST) antenna. The antenna 843 may, for example, perform short-range communication with an external device or wirelessly transmit/receive power required for charging. In another embodiment, an antenna structure may be formed by a part of the side bezel structure 837 and/or the first support member 838 or a combination thereof.

Figure 9:
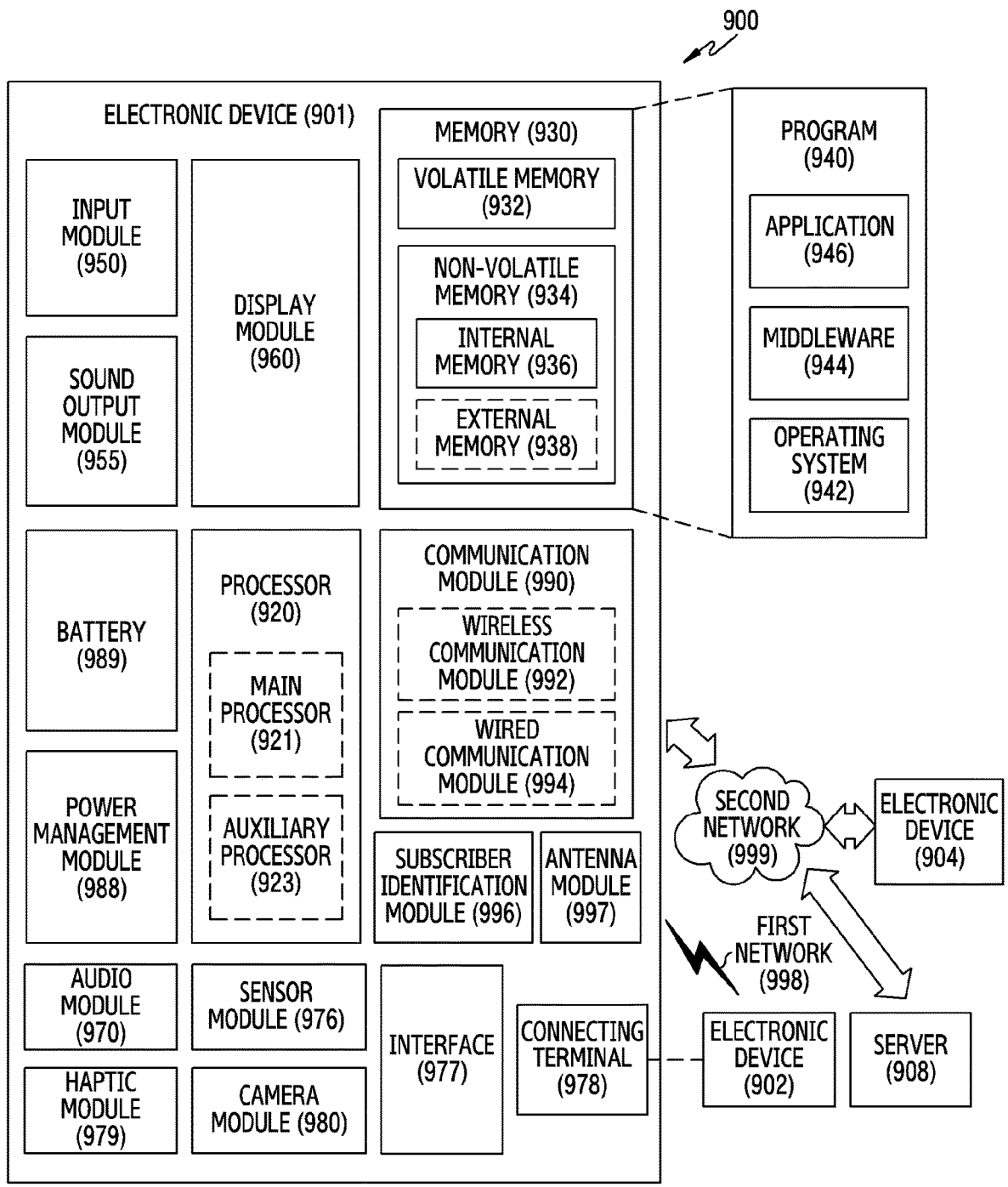
FIG. 9 is a block diagram illustrating an electronic device in a network environment according to an embodiment of the disclosure.

FIG. 9 is a block diagram illustrating an electronic device 901 in a network environment 900 according to an embodiment of the disclosure.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902 or 904, or the server 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 100 of FIG. 1) according to an embodiment may include a display (e.g., the display 130 of FIG. 1), an input sensing circuit configured to acquire a handwriting input received through the display, and at least one processor (e.g., the processor 110 of FIG. 1) configured to be electrically connected to the display and the input sensing circuit, wherein the at least one processor may be configured to use the input sensing circuit to recognize written characters generated by the handwriting input received through the display, to determine a slant of the recognized written characters, to straighten the recognized written characters based on the determined slant, and to control the display to overlap and display the recognized written characters and the straightened written characters.

According to an embodiment, the at least one processor may be configured to display a handler in an area corresponding to the recognized written characters, to determine an area including written characters to be straightened based on a user input to the handler, and to straighten the written characters included in the determined area.

According to another embodiment, the handler may include a box or a lasso tool.

According to another embodiment, when the handler is the box, the area including the written characters to be straightened may be adjusted up, down, left and right.

According to another embodiment, the written characters may include a plurality of character strings, a first character string among the plurality of character strings may have a first slant and a second character string may have a second slant, and the at least one processor may be configured to straighten the first character string positioned in an inner area of the handler and to maintain the second slant for the second character string positioned in an external area of the handler.

According to another embodiment, in response to identifying that the user input to the handler is released, the at least one processor may be configured to present effects for the first string and the second string through the display.

According to another embodiment, the at least one processor may be configured to process the recognized written characters to be translucent and to process the straightened written characters displayed overlapping with the recognized written characters to be opaque.

According to another embodiment, the at least one processor may be configured to display a context menu including at least one of convert to text, straighten (horizontal align), crop, copy, and change style based on a user input to the determined area by the handler.

The electronic device according to an embodiment may further include a memory (e.gl, the memory 120 of FIG. 1), wherein the at least one processor may be configured to store the straightened written characters in the memory based on a user input to the external area of the handler.

In the electronic device according to an embodiment, the input sensing circuit may be connected to a TSP or EMR sensing panel.

As described above, an operation method of an electronic device (e.g., the electronic device of FIG. 1) may include recognizing (operation 210 of FIG. 2) written characters generated by a handwriting input received through a display by using an input sensing circuit, determining (e.g., operation 220 of FIG. 2) a slant of the recognized written characters, straightening (e.g., operation 230 of FIG. 2) the recognized written characters based on the determined slant, and controlling (e.g., operation 210 of FIG. 2) the display to overlap and display the recognized written characters and the straightened written characters.

The operation method of the electronic device according to another embodiment may further include displaying a handler in an area corresponding to the recognized written characters, determining an area including written characters to be straightened based on a user input to the handler, and straightening the written characters included in the determined area.

In the operation method of the electronic device according to another embodiment, the handler may include a box or a lasso tool.

The operation method of the electronic device according to an embodiment may further include, when the handler is the box, adjusting the area including the written characters to be straightened to be up, down, left and right.

In the operation method of the electronic device according to another embodiment, the written characters may include a plurality of character strings, and a first character string among the plurality of character strings may have a first slant and a second character string may have a second slant. The operation method of the electronic device according to an embodiment may further include straightening the first character string positioned in an inner area of the handler, and maintaining the second slant for the second character string positioned in an external area of the handler.

The operation method of the electronic device according to another embodiment may further include presenting effects for the first string and the second string through the display in response to identifying that the user input to the handler is released.

The operation method of the electronic device according to another embodiment may further include processing the recognized written characters to be translucent, and processing the straightened written characters displayed overlapping with the recognized written characters to be opaque.

The operation method of the electronic device according to another embodiment may further include displaying a context menu including at least one of convert to text, straighten (horizontal align), crop, copy, and change style based on a user input to the determined area by the handler.

The operation method of the electronic device according to another embodiment may further include storing the straightened written characters in the memory based on a user input to an external area of the handler.

In the operation method of the electronic device according to another embodiment, the input sensing circuit may be connected to a TSP or EMR sensing panel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
an input sensing circuit configured to acquire a handwriting input received through the display; and
at least one processor configured to be electrically connected to the display and the input sensing circuit,
wherein the at least one processor is further configured to:
use the input sensing circuit to recognize handwritten characters generated by the handwriting input received through the display,
determine a slant of the recognized handwritten characters,
horizontally align the recognized handwritten characters based on the determined slant, and
control the display to overlap and display the recognized handwritten characters and the aligned handwritten characters.

2. The electronic device of claim 1, wherein the at least one processor is further configured to:
display a handler in an area corresponding to the recognized handwritten characters,
determine an area comprising handwritten characters to be horizontally aligned based on a user input to the handler, and
horizontally align the recognized handwritten characters comprised in the determined area.

3. The electronic device of claim 2, wherein the handler comprises a box or a lasso tool.

4. The electronic device of claim 3, wherein, when the handler is the box, the area comprising the recognized handwritten characters to be horizontally aligned is adjusted up, down, left and right.

5. The electronic device of claim 2,
wherein the recognized handwritten characters further comprises:
a plurality of character strings; and
a first character string among the plurality of character strings having a first slant and a second character string among the plurality of character strings having a second slant, and
wherein the at least one processor is further configured to:
align the first character string positioned in an inner area of the handler, and
maintain the second slant for the second character string positioned in an external area of the handler.

6. The electronic device of claim 5, wherein, in response to identifying that the user input to the handler is released, the at least one processor is further configured to present effects for the first character string and the second character string through the display.

7. The electronic device of claim 1, wherein the at least one processor is further configured to:
- process the recognized handwritten characters to be semi-translucent, and
- process the aligned handwritten characters displayed overlapping with the recognized handwritten characters to be opaque.

8. The electronic device of claim 2, wherein the at least one processor is further configured to display a context menu comprising at least one of convert to text, straighten, crop, copy, or change style based on a user input to the determined area by the handler.

9. The electronic device of claim 2, further comprising:
a memory,
wherein the at least one processor is further configured to store the aligned handwritten characters in the memory.

10. The electronic device of claim 1, wherein the input sensing circuit is connected to a touch screen panel (TSP) or electro-magnetic resonance (EMR) sensing panel.

11. An operation method of an electronic device, the operation method comprising:
- recognizing handwritten characters generated by a handwriting input received through a display by using an input sensing circuit;
- determining a slant of the recognized handwritten characters;
- horizontally aligning the recognized handwritten characters based on the determined slant; and
- controlling the display to overlap and display the recognized handwritten characters and the aligned handwritten characters.

12. The operation method of claim 11, further comprising:
- displaying a handler in an area corresponding to the recognized handwritten characters;
- determining an area comprising handwritten characters to be horizontally aligned based on a user input to the handler; and
- horizontally aligning the handwritten characters comprised in the determined area.

13. The operation method of claim 12, wherein the handler comprises a box or a lasso tool.

14. The operation method of claim 13, further comprising:
adjusting the area comprising the handwritten characters to be horizontally aligned to be up, down, left and right, when the handler is the box.

15. The operation method of claim 12,
wherein the handwritten characters further comprise:
- a plurality of character strings; and
- a first character string among the plurality of character strings having a first slant and a second character string having a second slant, and wherein the operation method further comprises:
- aligning the first character string positioned in an inner area of the handler, and
- maintaining the second slant for the second character string positioned in an external area of the handler.

16. The operation method of claim 12, wherein the user input is a touch and drag input.

17. The operation method of claim 16, wherein, while a user continues to drag an item, visually providing a shape in which the recognized handwritten characters being within the area determined by the handler are horizontally aligned, through a preview window.

18. The operation method of claim 17, wherein the method further comprises visually providing, a shape in which an existing slant for the recognized handwritten characters being outside the area determined by the handler is maintained.

19. The operation method of claim 12, further comprising:
displaying a context menu including at least one of convert to text, straighten, crop, copy, and change style based on a user input to the determined area by the handler.

20. The operation method of claim 11, further comprising:
processing the recognized handwritten characters to be semi-translucent, and processing the aligned handwritten characters displayed overlapping with the recognized handwritten characters to be opaque.

* * * * *